US009641925B2

(12) United States Patent
Chou

(10) Patent No.: US 9,641,925 B2
(45) Date of Patent: May 2, 2017

(54) HEADPHONE WIRELESS EXPANSION DEVICE CAPABLE OF SWITCHING AMONG MULTIPLE TARGETS AND VOICE CONTROL METHOD THEREOF

(71) Applicant: ZIPPY TECHNOLOGY CORP., New Taipei (TW)

(72) Inventor: Chin-Wen Chou, New Taipei (TW)

(73) Assignee: Zippy Technology Corp., New Taipei (TW)

( * ) Notice: Subject to any disclaimer, the term of this patent is extended or adjusted under 35 U.S.C. 154(b) by 152 days.

(21) Appl. No.: 14/146,235

(22) Filed: Jan. 2, 2014

(65) Prior Publication Data

US 2015/0189421 A1 Jul. 2, 2015

(51) Int. Cl.

| | |
|---|---|
| ***G06F 3/048*** | (2013.01) |
| ***G06F 15/173*** | (2006.01) |
| ***H04L 9/00*** | (2006.01) |
| ***H04M 1/00*** | (2006.01) |
| ***H04R 1/10*** | (2006.01) |

(52) U.S. Cl.

CPC ......... *H04R 1/1041* (2013.01); *H04R 1/1008* (2013.01); *H04R 2420/07* (2013.01)

(58) Field of Classification Search

CPC ......... G06F 3/048; G06F 15/173; H04L 9/00; H04M 1/00; G10L 15/02

USPC .......... 704/246, 273, 275; 340/4.37; 705/42; 713/170; 381/312, 331

See application file for complete search history.

(56) References Cited

U.S. PATENT DOCUMENTS

| | | | | |
|---|---|---|---|---|
| 7,254,708 | B2 * | 8/2007 | Silvester | H04L 63/08 713/168 |
| 8,315,876 | B2 * | 11/2012 | Reuss | G10L 17/24 700/175 |
| 9,191,382 | B1 * | 11/2015 | Hornung | G06F 21/31 |
| 2005/0202844 | A1 * | 9/2005 | Jabri | A61B 5/7475 455/556.1 |
| 2006/0008094 | A1 * | 1/2006 | Huang | H04S 3/008 381/79 |
| 2006/0166705 | A1 * | 7/2006 | Seshadri | H04M 1/05 455/569.1 |

(Continued)

*Primary Examiner* — Pierre-Louis Desir

*Assistant Examiner* — Seong Ah A Shin

(74) *Attorney, Agent, or Firm* — Muncy, Geissler, Olds & Lowe, P.C.

(57) ABSTRACT

A headphone wireless expansion device for switching among multiple targets is connected to an information device to receive audio data which is then transmitted to a headphone for playing. The headphone wireless expansion device includes multi-target connection data and an audio control mechanism. The multi-target connection data includes a plurality of device identification codes, a plurality of device authorization codes corresponding to a plurality of information devices respectively, and a plurality of audio tags corresponding to the device identification codes and the device authorization codes respectively. The audio control mechanism searches the audio tag having audio features same as that of the unrecognized audio signal, and reads the corresponding device identification code and device authorization code. The headphone wireless expansion device enables a conventional wired headphone to wirelessly connect with the information device and switch among multiple information devices via a voice control method through identifying the audio tag.

13 Claims, 9 Drawing Sheets

(56) References Cited

U.S. PATENT DOCUMENTS

| | | | | | |
|---|---|---|---|---|---|
| 2006/0166717 | A1* | 7/2006 | Seshadri | H04M 1/05 | 455/575.2 |
| 2007/0015537 | A1* | 1/2007 | DeBiasio | H04M 1/6091 | 455/556.1 |
| 2008/0091432 | A1* | 4/2008 | Dalton | G10L 15/26 | 704/275 |
| 2008/0157998 | A1* | 7/2008 | Zuo | H04M 1/2535 | 340/4.37 |
| 2008/0260169 | A1* | 10/2008 | Reuss | H04R 1/10 | 381/58 |
| 2009/0094662 | A1* | 4/2009 | Chang | H04N 7/162 | 725/141 |
| 2010/0138780 | A1* | 6/2010 | Marano | G06F 3/1415 | 715/804 |
| 2011/0313922 | A1* | 12/2011 | Ben Ayed | G06Q 20/108 | 705/42 |
| 2013/0268687 | A1* | 10/2013 | Schrecker | H04W 12/06 | 709/229 |
| 2014/0046664 | A1* | 2/2014 | Sarkar | H04W 12/06 | 704/246 |
| 2015/0358979 | A1* | 12/2015 | Puranik | H04B 1/3838 | 455/452.2 |

* cited by examiner

HEADPHONE WIRELESS EXPANSION DEVICE CAPABLE OF SWITCHING AMONG MULTIPLE TARGETS AND VOICE CONTROL METHOD THEREOF

FIELD OF THE INVENTION

The present invention relates to a headphone wireless expansion device capable of switching among multiple targets and a voice control method thereof, and particularly to a headphone wireless expansion device, which enables a wired headphone to be wirelessly connected to an information device and to be switched among multiple targets through voice control, and a voice control method thereof.

BACKGROUND OF THE INVENTION

The invention of headphones allows one to listen to desired music without affecting people around. With the popularity of portable electronic devices, applications of headphone are becoming even more common. Data transmission of headphones is mainly implemented by either a wired or wireless fashion. In the wired fashion, a wired headphone usually includes a speaker module and an electrical connecting wire. The electrical connecting wire is connected to the speaker module, and receives audio data from an information device and renders the speaker module to vibrate for generating sounds. In fact, the electrical connecting wire is a critical component of the wired headphone, and so the functionality of the electrical connecting wire, also decides whether the wired headphones are functional. Since the electrical connecting wire is a physical line, it is prone to pulling or twisting when a user listens through the headphone and may result in breakdown such that the wired headphone become incapable of playing audio data as expected. Further, the current wired headphone cannot change the audio information transmission manner thereof. Audio data to be played by the speaker module can only be transmitted from the information device to the speaker module via the electrical connecting wire.

The availability of wireless headphones has solved the application limitations caused by the electrical connecting wire for wired headphones. However, the current wireless headphone is only capable of connecting to one information device instead of being capable immediately switching and connecting to another information device. A pairing procedure needs to be first performed in order to connect the wireless headphone to a desired information device before using. To change a connection target, the pairing procedure needs to be performed again and previous pairing information needs to be deleted. Such repeated pairing procedure is rather inconvenient for a user in utilizing the wireless headphone.

SUMMARY OF THE INVENTION

Therefore the primary object of the present invention is to provide a headphone wireless expansion device for switching among multiple targets and a voice control method thereof. The headphone wireless expansion device of the present invention enables a wired headphone to be wirelessly connected to an information device and to be switched among multiple targets through voice control.

To achieve the above object, a headphone wireless expansion device for switching among multiple targets is provided. The headphone wireless expansion device is connected to a headphone including an audio data transmission unit, and includes an audio capturing unit, a control unit, a wireless communication unit and an audio information transmission unit. The audio capturing unit captures a user's voice and outputs an unrecognized audio voice signal. The control unit is connected to the audio capturing unit for receiving the unrecognized audio signal, and includes multi-target connection data and an audio control mechanism. The multi-target connection data includes a plurality of device identification codes, a plurality of device authorization codes corresponding to a plurality of information devices respectively, and a plurality of audio tags corresponding to the device identification codes and the device authorization codes respectively. The audio control mechanism analyzes audio features of the unrecognized audio signal to search the audio tag with the audio features same as the audio features of the unrecognized audio signal, and outputs the device identification code and the device authorization code corresponding to the identified audio tag. The wireless communication unit is connected to the control unit for receiving the device identification code and the device authorization code corresponding to the identified audio tag to connect to the corresponding information device, and receives audio data from the information device and to transmit the audio data to the control unit. The audio information transmission unit is connected to the control unit and the audio data transmission unit of the headphone to receive the audio data from the control unit and transmit the audio data to the headphone for playing via the audio data transmission unit.

In an embodiment, the wireless communication unit includes a Bluetooth module and a near field communication (NFC) module connecting with the Bluetooth module.

In an embodiment, the control unit includes an audio recognition module which analyzes the audio features of the unrecognized audio signal and compares the audio features of the unrecognized audio signal with the audio features of the audio tag.

A headphone wireless expansion device is further provided according to another embodiment of the present invention. The headphone wireless expansion device is connected to a headphone including an audio data transmission unit and an audio capturing unit. The audio capturing unit captures a user's voice and outputs an unrecognized audio signal. The headphone wireless expansion device includes an audio information transmission unit, a control unit and a wireless communication unit. The audio information transmission unit is connected to the audio data transmission unit, and receives the unrecognized audio signal from the headphone. The control unit is connected to the audio information transmission unit for receiving the unrecognized audio signal, and includes multi-target connection data and an audio control mechanism. The multi-target connection data includes a plurality of device identification codes, a plurality of device authorization codes corresponding to a plurality of information devices respectively, and a plurality of audio tags corresponding to the device identification codes and the device authorization codes respectively. The audio control mechanism analyzes audio features of the unrecognized audio signal and searches the audio tag with the audio features same as the audio features of the unrecognized audio signal to outputs the device identification code and the device authorization code corresponding to the identified audio tag. The wireless communication unit is connected to the control unit for receiving the device identification code and the device authorization code corresponding to the identified audio tag to connect to the corresponding information device, and receives audio data from the information device and transmits the audio data via the control unit to the audio information transmission unit for the earphone to play.

In an embodiment, the wireless communication unit includes a Bluetooth module and a near field communication (NFC) module connecting with the Bluetooth module.

In an embodiment, the control unit includes an audio recognition module which analyzes the audio features of the unrecognized audio signal and compares the audio features of the unrecognized audio signal with the audio features of audio tag.

A voice control method for switching among multiple targets via a headphone wireless expansion device is further provided by the present invention. The voice control method includes the following steps.

In step (a), a headphone wireless expansion device including multi-target connection data, an audio control mechanism and a wireless communication unit is provided, and is connected with a headphone. The multi-target connection data includes a plurality of device identification codes, a plurality of device authorization codes corresponding to a plurality of information devices respectively, and a plurality of audio tags corresponding to the device identification codes and the device authorization codes respectively.

In step (b), an unrecognized audio signal generated from a user's voice is captures by an audio capturing unit.

In step (c), the headphone wireless expansion device analyzes audio features of the unrecognized audio signal by the audio control mechanism, and searches the audio tag having audio features same as the audio features of the unrecognized audio signal to output the device identification code and the device authorization code corresponding to the identified audio tag.

In step (d), the wireless communication unit of the headphone wireless expansion device establishes a bidirectional wireless connection with the corresponding information device according to the device identification code and the device authorization code, and receives audio data from the information device for playing.

In an embodiment of the voice control method of the present invention, step (a) further includes the following sub-steps. In sub-step (a1), the headphone wireless expansion device is provided with a connection target detection mode for detecting the information device connectable to the headphone wireless expansion device within a connection range. In sub-step (a2), the connection target detection mode is activated to get the device identification code and the device authorization code of the information device by the wireless communication unit, and an untagged audio signal generated by a user's voice is captured Audio features of the untagged audio signal is analyzed and set as the audio tag by the audio control mechanism. In sub-step (a3), the device identification code and the device authorization code of the information device are set to be related to the audio tag for reading, and the relationship is recorded in the multi-target connection data.

In another embodiment of the voice control method of the present invention, step (a) further includes the following sub-steps. In sub-step (a4), the headphone wireless expansion device is provided with the connection target detection mode for detecting the information device connectable to the headphone wireless expansion device within the connection range. In sub-step (a5), the connection target detection mode is activated, and the headphone wireless expansion device is connected and paired with the information device by a near field communication (NFC) module installed in the wireless communication unit to get the device identification code and the device authorization code of the information device. Then, an untagged audio signal generated by a user's voice is captured, and audio features of the untagged audio signal is analyzed and set as the audio tag by the audio control mechanism. In sub-step (a6), the device identification code and the device authorization code of the information device are set to be related to the audio tag for reading, and the relationship is recorded in the multi-target connection data.

In yet another embodiment of the voice control method of the present invention, in step (d) the wireless communication unit establishes the connection with the information device via the IEEE802.15.1.

In yet another embodiment of the voice control method of the present invention, the audio capturing unit is disposed on the headphone.

In yet another embodiment of the voice control method of the present invention, the headphone wireless expansion device includes an audio information transmission unit and a control unit. The audio information transmission unit receives the unrecognized audio signal from the headphone. The control unit is connected to the audio information transmission unit and the wireless communication unit, and includes the multi-target connection data and the audio control mechanism.

In yet another embodiment of the voice control method of the present invention, the audio capturing unit is disposed on the headphone wireless expansion device, and the headphone wireless expansion device includes a control unit and an audio information transmission unit. The control unit is connected to the audio information transmission unit and the wireless communication unit, and includes the multi-target connection data and the audio control mechanism. The audio information transmission unit is connected to the headphone to output the audio data to the headphone.

Compared to the prior art, the headphone wireless expansion device and the associated voice control method of the present invention provide the following characteristics. First of all, the headphone wireless expansion device enables a headphone without wireless communication function to be connected to an information device through wireless means. Secondly, the headphone wireless expansion device is capable of switching among a plurality of information device according to the multi-target connection data, so that the headphone is not limited to playing the audio data outputted from the single information device. Moreover, the headphone wireless expansion device is capable of performing switch via voice control, thereby solving inconveniences of conventional manual operations and thus significantly enhancing the convenience of the headphone wireless expansion device when switching the connection target.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
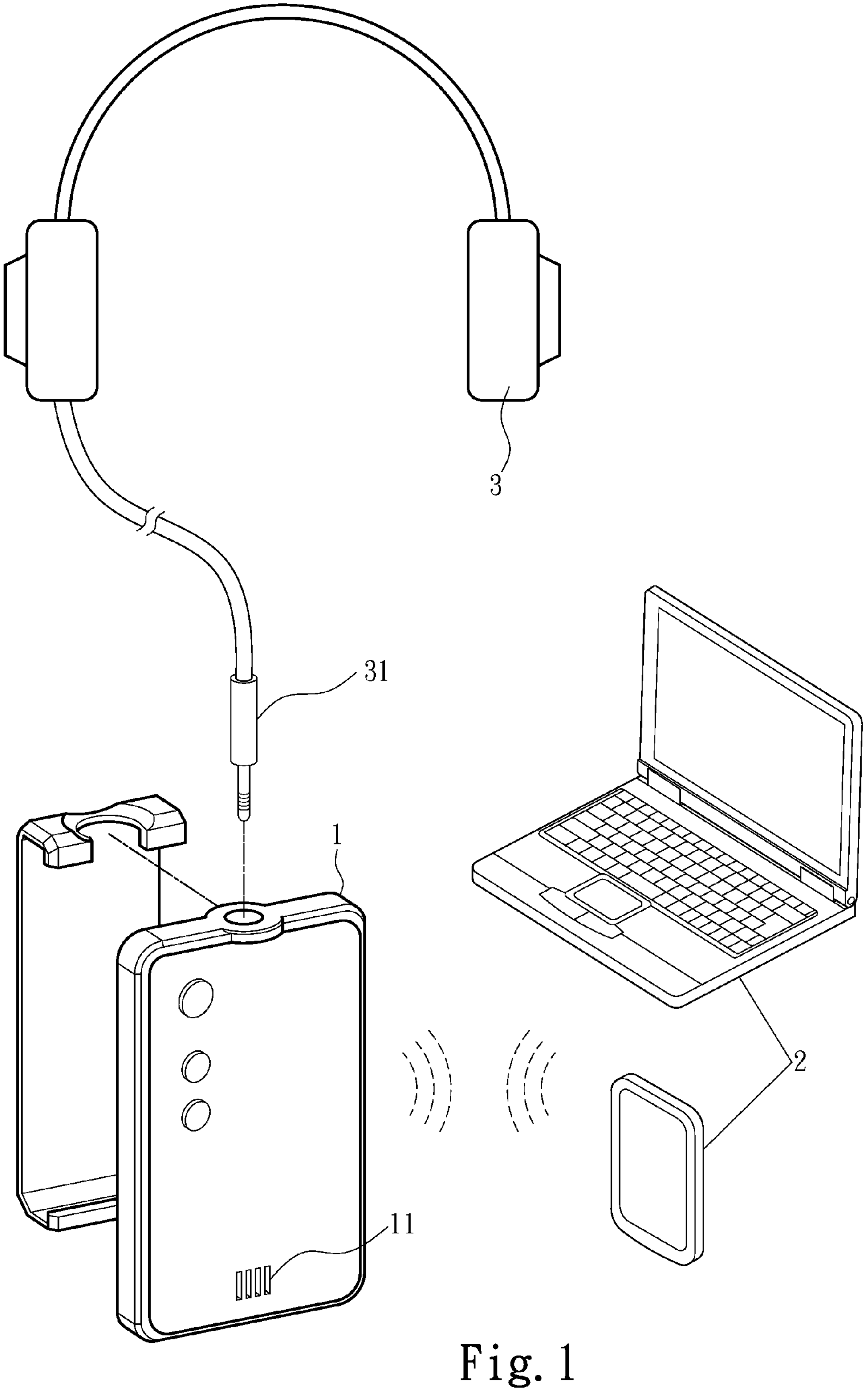
FIG. 1 is a schematic diagram according to a first embodiment of the present invention.
Figure 2:
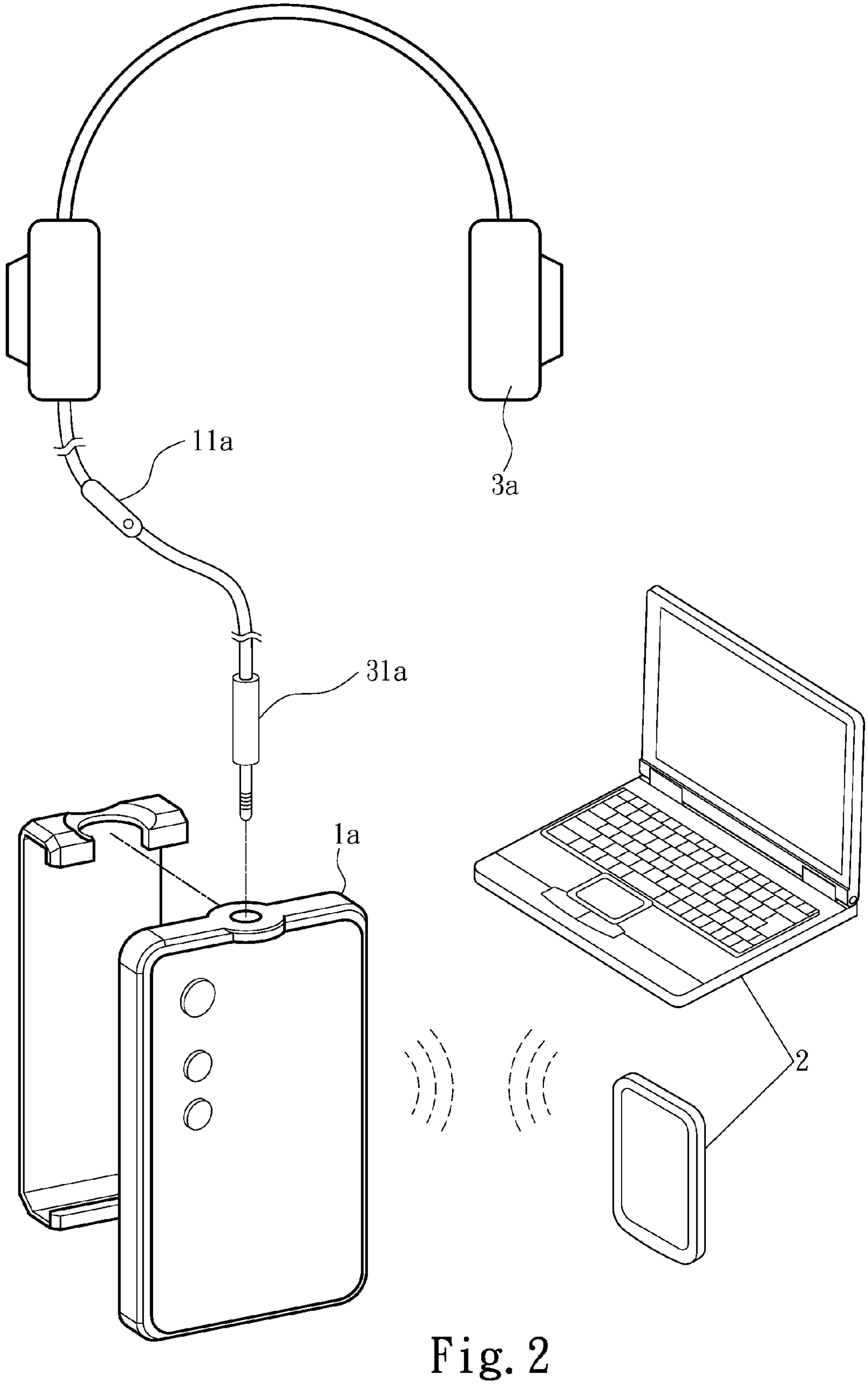
FIG. 2 is a schematic diagram according to a second embodiment of the present invention.
Figure 3:
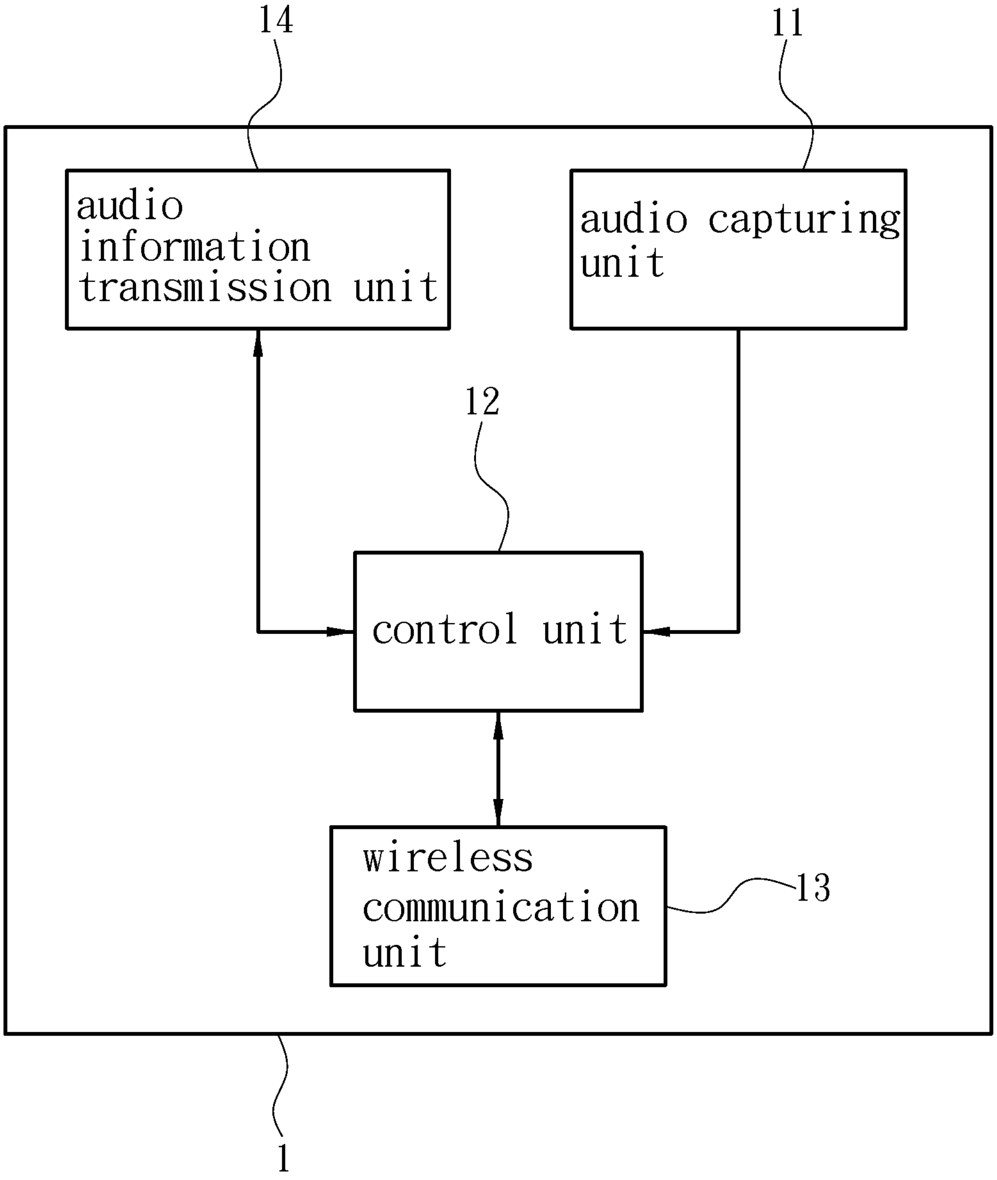
FIG. 3 is a block diagram of a headphone wireless expansion device according to the first embodiment of the present invention.

Referring to FIGS. 1 to 3, a headphone wireless expansion device for switching among multiple targets and a voice control method thereof are provided by the present invention. A headphone wireless expansion device 1 is capable of connecting to an information device 2 to receive audio data from the information device 2. For example, the information device 2 may be selected from a group consisted of a mobile phone, a desktop computer, a laptop computer, a tablet computer and a smart TV. The headphone wireless expansion device 1 is further connected with a headphone 3. The headphone 3 may be a wired headphone, and may be implemented by two different types. In the first type, the headphone 3 includes an audio data transmission unit 31. In the second type, in addition to the audio data transmission unit 31*a*, the headphone 3 further includes an audio capturing unit 11*a* (as shown in FIG. 2). More specifically, the audio data transmission unit 31 and 31*a* is an audio connector commonly applied in current headphones, and the audio capturing unit 11*a* may be a microphone that captures a user's voice to output an unrecognized audio signal.

The headphone of a first type is taken as an example to be described below to better understand the present invention. In this embodiment, the headphone wireless expansion device 1 includes an audio capturing unit 11, a control unit 12, a wireless communication unit 13 and an audio information transmission unit 14. The audio capturing unit 11 is a microphone, and captures the user's voice to output the unrecognized audio signal after being activated. The control unit 12 connects to the audio capturing unit 11 to receive the unrecognized audio signal, and includes multi-target connection data and an audio control mechanism. It should be noted that the headphone wireless expansion device 1 of the present invention is compliant to IEEE802.15.1 communication protocol. The multi-target connection data includes a plurality of device identification codes, a plurality of device authorization codes corresponding to a plurality of information devices 2, and a plurality of audio tags corresponding to the device identification codes and the device authorization codes respectively. More specifically, the device identification code is a BD_address defined in the IEEE802.15.1 communication protocol, the device authorization code is a link_key defined in the IEEE802.15.1 communication protocols, and the audio tag is set to be related to the device identification code and the device authorization code for reading. That is, when reading the audio tag, the control unit 12 at the same time reads the corresponding device identification code and the device authorization code. In practice, the audio tag is audio feature information, i.e. spectrum data generated from processing an audio signal by Fourier transform. The audio control mechanism may be a recognition mechanism calibrated by a dynamic timeline or a recognition mechanism implemented by a Markov model to analyze the unrecognized audio signal received by the control unit 12. Based on the above analysis mechanisms, audio features of the unrecognized audio signal are analyzed, and then compared with audio features of the audio tag. When the audio tag with the audio features same as the audio features of the unrecognized audio signal is identified from the multi-target connection data, the control unit 12 reads and outputs the device identification code and device authorization code corresponding to the identified audio tag to the wireless communication unit 13. Further, the control unit 12 may include a digital signal processing module 121 that modulates the audio signal in the frequency domain, at least one memory module 122 that stores the multi-target connection data, and an audio recognition module 123 for analyzing the audio features of the unrecognized audio signal and comparing the audio features with the audio tag.

The wireless communication unit 13 is connected to the control unit 12 to receive the device identification code and the device authorization code outputted by the control unit 12. As such, the wireless communication unit 13 further connects to the information device 2 corresponding to the device identification code and the device authorization code, so as to receive and transmit the audio data outputted by the information device 2 to the control unit 12. The audio information transmission unit 14 is connected to the control unit 12 and the audio data transmission unit 31 of the headphone 3 to receive the audio data from the control unit 12 and then transmit the audio data to the headphone 3 through the audio data transmission unit 31 for playing. The audio information transmission unit 14 is an audio output port or an audio output connector.

In addition to the first embodiment above, a second embodiment is given below by also taking the second type headphone 3 as an example to better understand the present invention. In the second embodiment, in addition to the audio data transmission unit 31*a*, the headphone 3*a* further includes the audio capturing unit 11*a* that replaces the audio capturing unit 11 of the headphone wireless expansion device 1 in the first embodiment. That is to say, in the second embodiment, the headphone wireless expansion device 1*a* does not include the audio capturing unit 11. The unrecognized audio signal is generated by the audio capturing unit 11*a* and outputted via the audio data transmission unit 31*a* to the headphone wireless expansion device 1*a* for subsequent processing. Other details are as previously described and shall be omitted herein.

Figure 4:
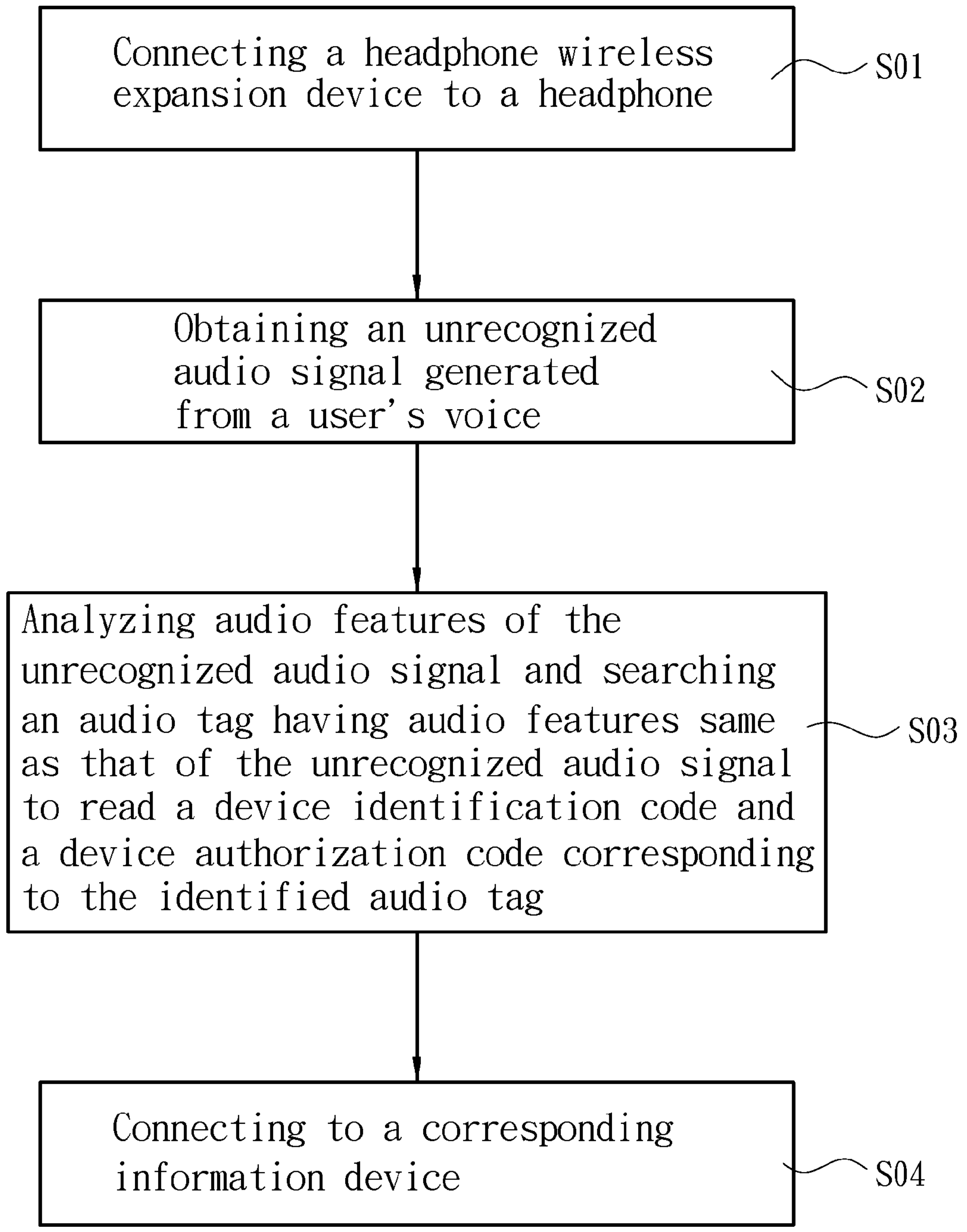
FIG. 4 is a flowchart of a voice control method of the present invention.

Apart from the headphone wireless expansion device 1, a voice control method for the headphone wireless expansion device 1 is further provided by the present invention. Please refer to FIG. 4 for a flowchart of the voice control method. In step S01, the headphone wireless expansion device 1 including the multi-target connection data, the audio control mechanism and the wireless communication unit 13 is provided, and it is connected to the headphone 3. The multi-target connection data includes the device identification codes, the device authorization codes corresponding to the plurality of information devices respectively, and the audio tags corresponding to the device identification codes and the device authorization codes respectively. In step S02, the unrecognized audio signal generated from a user's voice is captured by the audio capturing unit 11 or 11*a*. In step S03, the headphone wireless expansion device 1 analyzes audio features of the unrecognized audio signal by the audio control mechanism, and searches the audio tag having the audio features same as that of the unrecognized audio signal to output the device identification code and the device authorization code corresponding to the identified audio tag. In step S04, the wireless communication unit 13 of the headphone wireless expansion device 1 establishes a bidirectional wireless connection with the corresponding information device 2 according to the device identification code and the device authorization code, and receives the audio data from the information device 2 for playing.

Figure 5:
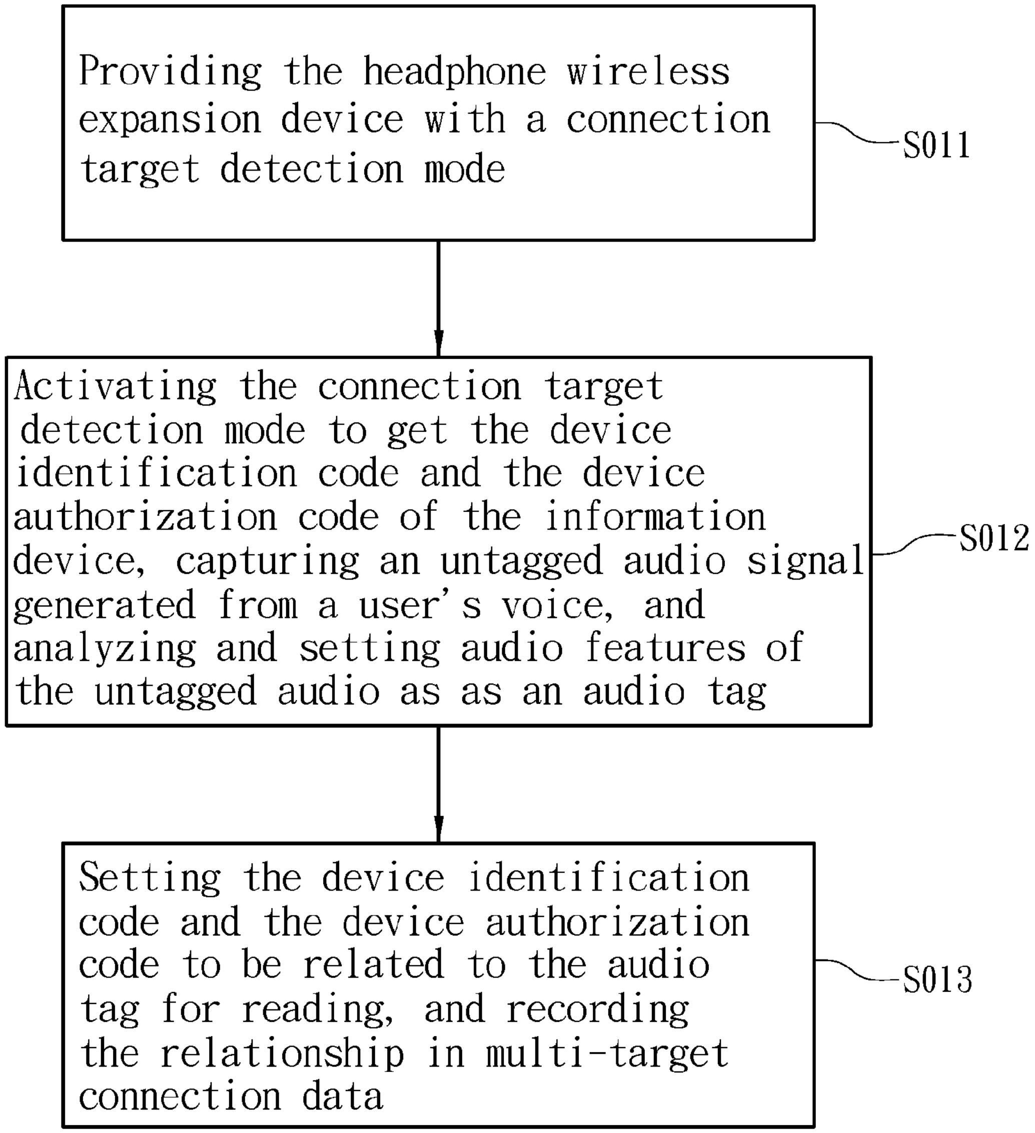
FIG. 5 is a flowchart of sub-steps of step one in the voice control method according to the first embodiment of the present invention.

The previously described first embodiment of the headphone wireless expansion device 1 is taken to be explained the voice control method of the present invention. Before applying, the headphone wireless expansion device 1 is preset to store information about the information devices 2 that can be paired with. That is to say, before being applied, the headphone wireless expansion device 1 has recorded the device identification codes, the device authorization codes and the audio tags corresponding to the information devices 2 that can be paired for connection. Referring to FIG. 5, the headphone 3 is connected to the headphone wireless expansion device 1 via the audio information transmission unit 14. Next, a speech is given to the headphone wireless expansion device 1, so that the audio capturing unit 11 receives the speech and captures the unrecognized audio signal. The unrecognized audio signal is then analyzed by the audio control mechanism to obtain audio features thereof audio signal, and the multi-target connection data is searched to identify the audio tag having the audio features same as that of the unrecognized audio signal. When the audio tag having the same audio features is identified, the device identification code and the device authorization code corresponding to the identified audio tag are outputted. The headphone wireless expansion device 1 immediately establishes a connection with the corresponding information device 2 according to the device identification code and the device authorization code, receives the audio data from the information device 2, and transmits the audio data via the audio information transmitting device 14 to the headphone 3 for playing.

More details about the presetting procedure of the voice control method of the present invention are further given below. Referring to FIG. 5, step S01 of the voice control method of the present invention further includes the following sub-steps. In sub-step S011, the headphone wireless expansion device 1 includes a connection target detection mode for detecting the information device 2 connectable to the headphone wireless expansion device 1 within a connection range. In sub-step S012, the connection target detection mode is activated to get the device identification code and the device authorization code of the information device 2 are obtained by the wireless communication unit. Then, an untagged audio signal generated by the user's voice is captured and analyzed by the audio control mechanism. The audio features of the untagged audio signal obtained from the analysis are set as the audio tag and recorded in the multi-target connection data. In sub-step S013, the device identification code and the device authorization code of the information device 2 are set to be related to the audio tag for reading, and the device identification code, the device authorization code, the audio tag and their relationship is recorded in the multi-target connection data.

Figure 6:
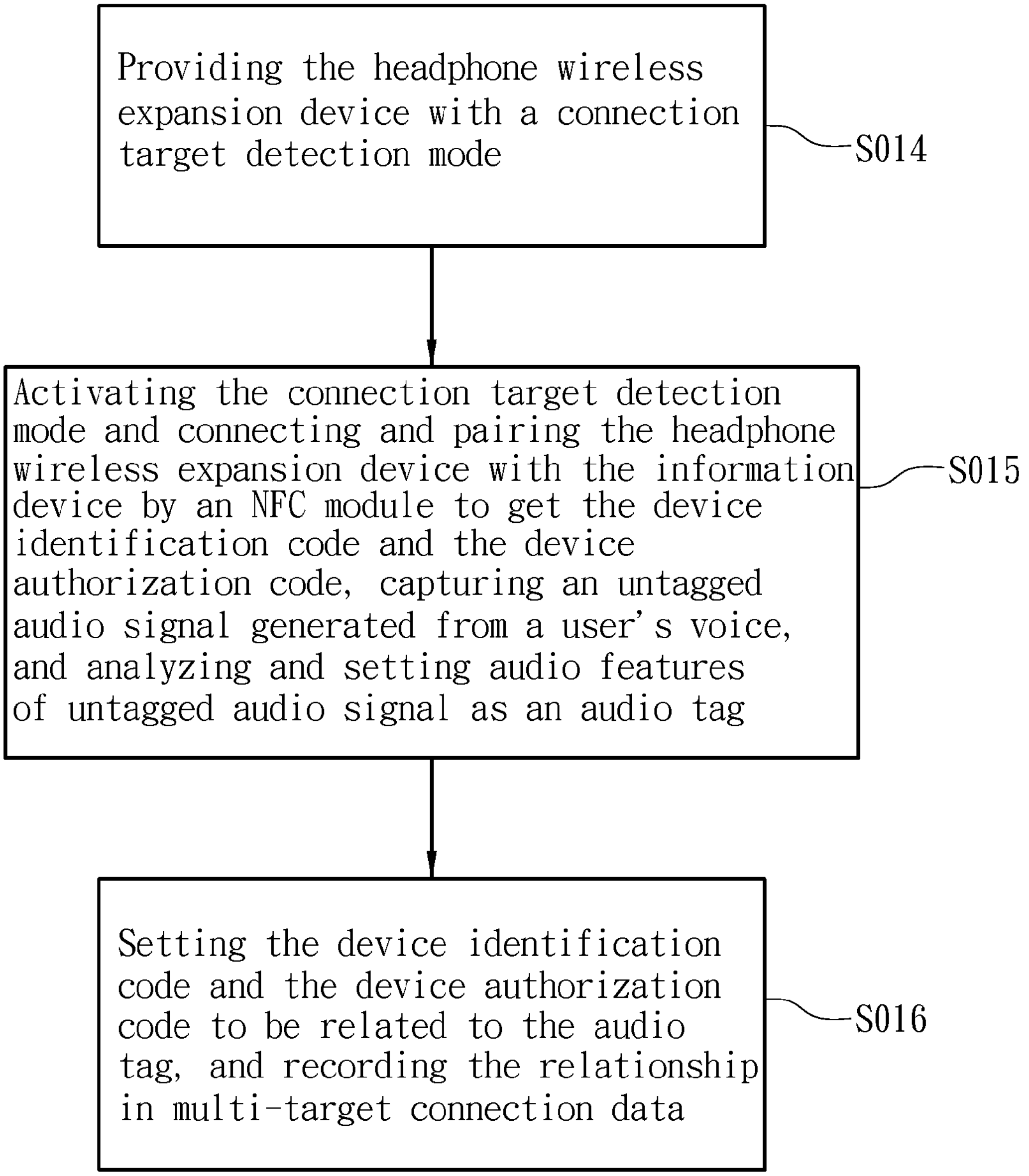
FIG. 6 is a flowchart of sub-steps of step one in the voice control method according to the second embodiment of the present invention.
Figure 7:
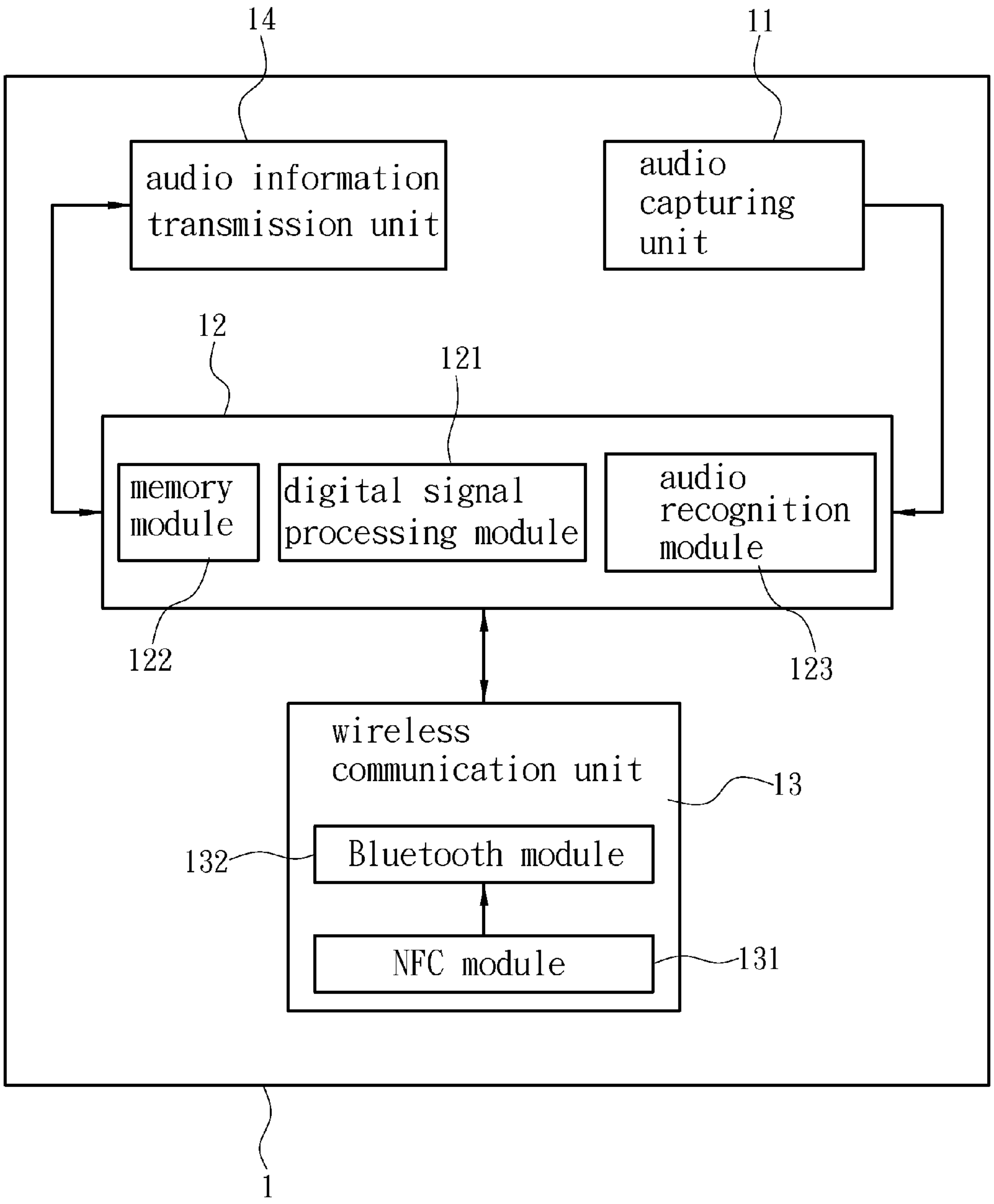
FIG. 7 is another block diagram of a headphone wireless expansion device according the first embodiment of the present invention.

In practice, the wireless communication unit 13 of the headphone wireless expansion device 1 may be a Bluetooth module 132, and the connection target detection mode of the present invention is the pairing procedure of the Bluetooth module 132 in advance. When the information device 2 found within the connection range of the wireless communication unit 13 responses the connect request, the wireless communication unit 13 obtains the device identification code and the device authorization code of the information device 2. The user may then speak to the audio capturing unit 11 of the headphone wireless expansion device 1 to generate the untagged audio signal. The untagged audio signal is analyzed for audio features thereof, and the analyzed audio features of the untagged audio signal are set as the audio tag corresponding to the information device 2. The analyzed audio features, the device identification code and the device authorization code are then recorded in the multi-target connection data. Referring to FIG. 7, in addition to implementing the wireless communication unit 13 as a Bluetooth module 132, the wireless communication unit 13 of the present invention may also be implemented by a Bluetooth module 132 accompanied with a near-field communication (NFC) module 131. The NFC module 131 is connected to a pairing pin of the Bluetooth module 132 (not shown in the drawing), and outputs pairing information to the Bluetooth module 132 in response to the pairing procedure to quickly pair the Bluetooth module 132 with the information device 2. Thus, in the embodiment performing the pairing procedure by the NFC module 131, as shown in FIG. 6, step S01 includes the following sub-steps. In sub-step S014, the headphone wireless expansion device 1 is provided with the connection target detection mode for detecting the information device 2 connectable to the headphone wireless expansion device 1 within the connection range. In sub-step S015, the connection target detection mode is activated, and the headphone wireless expansion device 1 is connected and paired with the information device 2 via the NFC module 131 to obtain the device identification code and the device authorization code of the information device 2. Then, the untagged audio signal is captured and analyzed by the audio control mechanism. The audio features of the untagged audio signal obtained from the analysis are then set as the audio tag and recorded in the multi-target connection data. In sub-step S016, the device identification code and the device authorization code of the information device 2 are set to be related to the audio tag for reading, and this relationship is recorded in the multi-target connection data.

Figure 8:
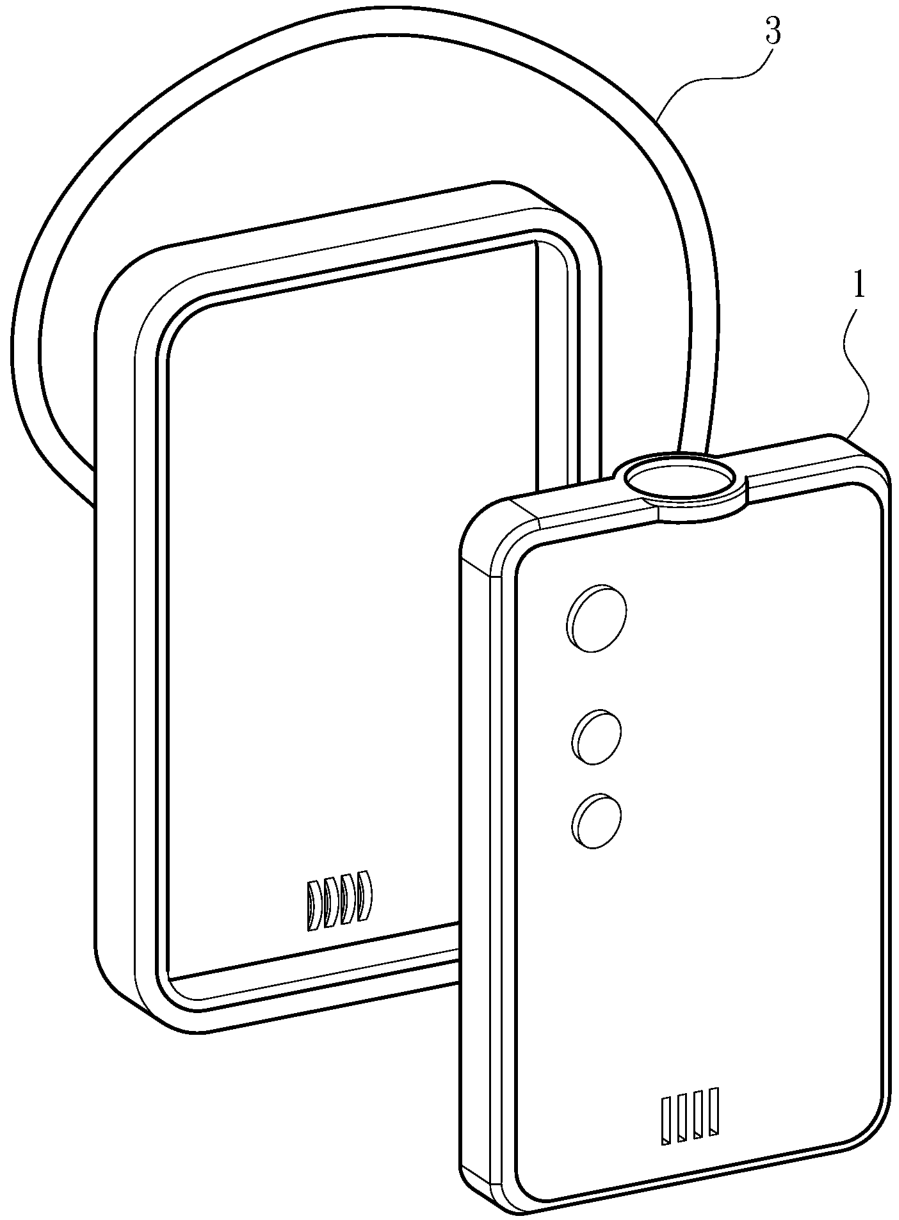
FIG. 8 is a schematic diagram of a first appearance embodiment of the present invention.
Figure 9:
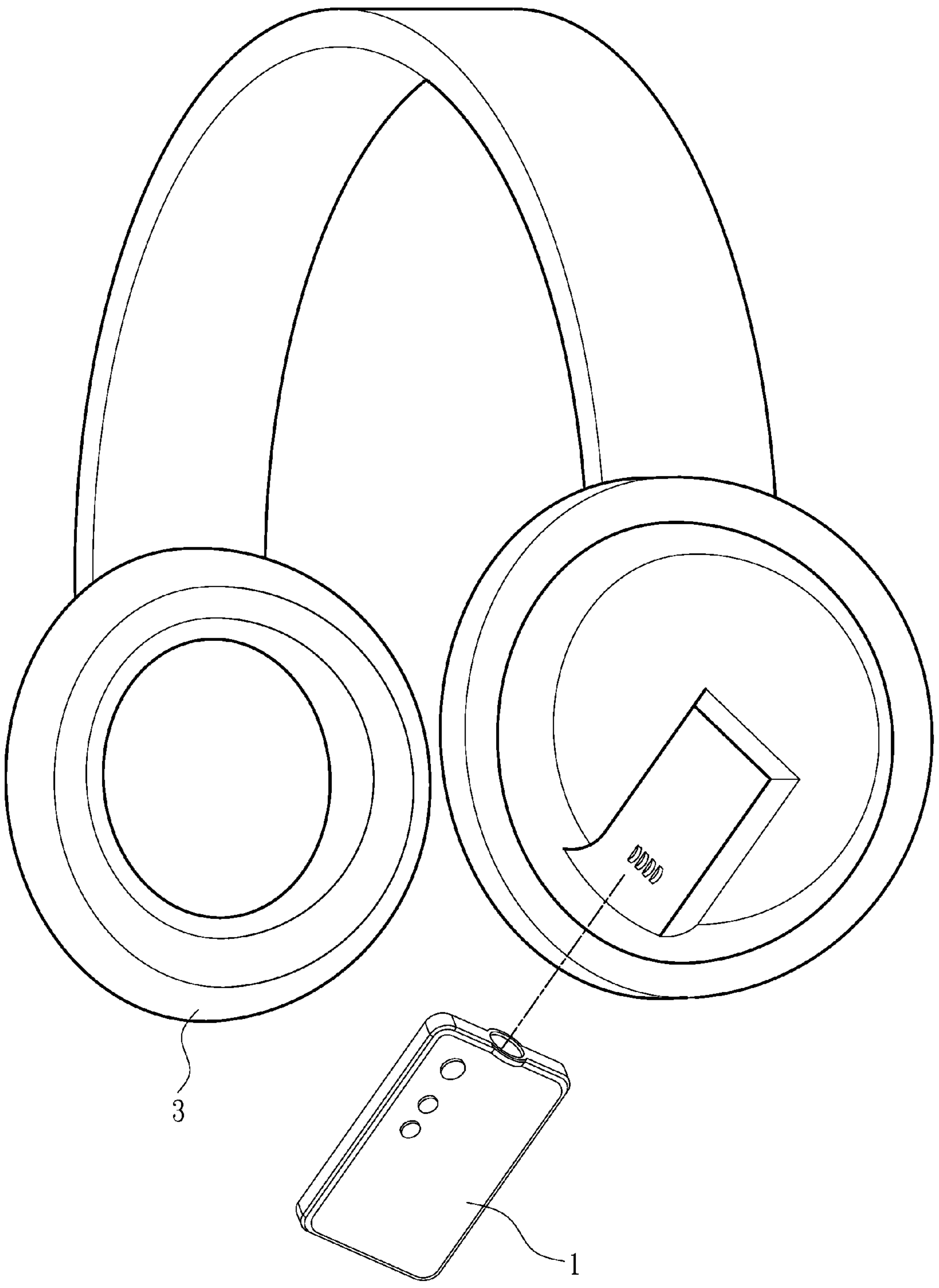
FIG. 9 is a schematic diagram of a second appearance embodiment of the present invention.

In addition to the above embodiments, modifications for design purpose can be made to the headphone wireless expansion device 1 and the headphone 3 in other embodiments. For example, the headphone 3 may be implemented in different types according to the appearance thereof, as shown in FIG. 8 and FIG. 9.

As explained with the embodiments, a headphone wireless expansion device for switching among multiple targets and a voice control method thereof are provided by the present invention. The headphone wireless expansion device is connected to an information device to receive audio data, and outputs the audio data to a headphone for playing. The headphone wireless expansion device includes multi-target connection data and an audio control mechanism. The multi-target connection data includes a plurality of device identification codes and a plurality of device authorization codes corresponding to a plurality of information devices respectively, and a plurality of audio tags corresponding to the device identification codes and the device authorization codes respectively. The audio control mechanism analyzes audio features of an unrecognized audio signal and searches the audio tag with the audio features same as the audio features of unrecognized audio signal to read the corresponding device identification code and device authorization code. The headphone wireless expansion device enables a conventional wired headphone to be wirelessly connected with the information device, and can be switched among multiple information devices via a voice control manner.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A headphone wireless expansion device for switching among multiple targets, connecting to a headphone comprising an audio data transmission unit, the headphone wireless expansion device comprising:

an audio capturing unit for capturing an unrecognized voice frequency signal generated from a user's voice;

a control unit connecting to the audio capturing unit for receiving the unrecognized voice frequency signal, the control unit memorizing a multi-target connection data and an audio control mechanism, the multi-target connection data storing a device identification code and a device authorization code, both of which are corresponding to one of a plurality of information devices respectively, and voice frequency data corresponding and being set to be related to the device identification code and the device authorization code respectively, the audio control mechanism for analyzing voice frequency feature of the unrecognized voice frequency signal and searching the voice frequency data of the multi-target connection data having same frequency features as the frequency features of the unrecognized voice frequency signal to output the device identification code and the device authorization code corresponding to the identified voice frequency data;

a wireless communication unit including a Bluetooth module and connecting to the control unit, the wireless communication unit via the Bluetooth module receiving the device identification code and the device authorization code corresponding to the identified voice frequency data to connect to the corresponding information device and via the Bluetooth module receiving audio data from the information device to transmit to the control unit; wherein, when the control unit receives another unrecognized voice frequency signal, the wireless communication unit via the Bluetooth module receives another device identification code and another device authorization code from the control unit corresponding to the unrecognized voice frequency signal and switches connection from the information device to another information device; and an audio information transmission unit connecting to the control unit and the audio data transmission unit of the headphone for transmitting the audio data from the control unit to the headphone through the audio data transmission unit for playing.

2. The headphone wireless expansion device of claim 1, wherein the wireless communication unit comprises a near field communication (NFC) module connecting with the Bluetooth module.

3. The headphone wireless expansion device of claim 1, wherein the control unit comprises an audio recognition module which analyzes the frequency features of the unrecognized voice frequency signal and compares the frequency features of the unrecognized voice frequency signal with the frequency features of the voice frequency data.

4. A headphone wireless expansion device for switching among multiple targets, connecting to a headphone comprising an audio data transmission unit and an audio capturing unit, the audio capturing unit capturing an unrecognized voice frequency signal generated from a user's voice, the headphone wireless expansion device comprising:

an audio information transmission unit connecting to the audio data transmission unit for receiving the unrecognized voice frequency signal from the headphone;

a control unit connecting to the audio information transmission unit for receiving the unrecognized voice frequency signal, the control unit memorizing a multi-target connection data and an audio control mechanism, the multi-target connection data storing a device identification code and a device authorization code, both of which are corresponding to one of a plurality of information devices respectively, and voice frequency data corresponding and being set to be related to the device identification code and the device authorization code respectively, and the audio control mechanism for analyzing voice frequency features of the unrecognized voice frequency signal and searching the voice frequency data of the multi-target connection data having same frequency features as the frequency features of the unrecognized voice frequency signal to output the device identification code and the device authorization code corresponding to the identified voice frequency data; and a wireless communication unit including a Bluetooth module and connecting to the control unit, the wireless communication unit via the Bluetooth module receiving the device identification code and the device authorization code corresponding to the identified voice frequency data to connect to the corresponding information device and via the Bluetooth module receiving audio data from the information device to transmit to the audio data transmission unit through the control unit for the headphone to play; wherein, when the control unit receives another unrecognized voice frequency signal, the wireless communication unit via the Bluetooth module receives another device identification code and another device authorization code from the control unit corresponding to the unrecognized voice frequency signal and switches connection from the information device to another information device.

5. The headphone wireless expansion device of claim 4, wherein the wireless communication unit comprises a near field communication (NFC) module connecting with the Bluetooth module.

6. The headphone wireless expansion device of claim 4, wherein the control unit comprises an audio recognition module which analyzes the frequency features of the unrecognized voice frequency signal and compares the frequency features of the unrecognized voice frequency signal with the frequency features of the voice frequency data.

7. A voice control method for switching among multiple targets via a headphone wireless expansion device, comprising steps of:

a) providing a headphone wireless expansion device comprising multi-target connection data, an audio control mechanism and a wireless communication unit, and connecting the headphone wireless expansion device to a headphone, the multi-target connection data storing a device identification code, a device authorization code, both of which are corresponding to one of a plurality of information devices respectively, and voice frequency data corresponding and being set to be related to the device identification code and the device authorization code respectively;

b) capturing an unrecognized voice frequency signal generated from a user's voice by an audio capturing unit;

c) analyzing frequency features of the unrecognized voice frequency signal by the audio control mechanism of the headphone wireless expansion device, and searching the voice frequency data of the multi-target connection data having same frequency features as the frequency features of the unrecognized voice frequency signal to output the device identification code and the device authorization code corresponding to the identified voice frequency data; and d) establishing a bidirectional wireless information connection between the headphone wireless expansion device and the information device via a Bluetooth module by the wireless communication unit of the headphone wireless expansion device according to the device identification code and the device authorization code, and receiving audio data from the information device for playing; wherein, after the step d), when the audio capturing unit receives another unrecognized voice frequency signal, the audio control mechanism searches and outputs another device identification code and another device authorization code corresponding to the unrecognized voice frequency signal and the wireless communication unit via the Bluetooth module switches connection from the information device to another information device.

8. The voice control method of claim 7, wherein step (a) further comprises sub-steps of:

a1) providing the headphone wireless expansion device with a connection target detection mode for detecting the information device connectable to the headphone wireless expansion device within a connection range;

a2) activating the connection target detection mode to get the device identification code and the device authorization code of the information device by the wireless communication unit, capturing an untagged voice frequency signal generated from a user's voice, and analyzing and setting frequency features of the untagged voice frequency signal as the voice frequency data tag by the audio control mechanism; and a3) setting the device identification code and the device authorization code of the information device to be related to the voice frequency data for reading, and recording the relationship in the multi-target connection data.

9. The voice control method of claim 7, wherein step (a) further comprises sub-steps of:

a4) providing the headphone wireless expansion device with a connection target detection mode for detecting the information device connectable to the headphone wireless expansion device within a connection range;

a5) activating the connection target detection mode and connecting and pairing the headphone wireless expansion device with the information device by a near field communication (NFC) module installed in the wireless communication unit of the headphone wireless expansion device to get the device identification code and the device authorization code of the information device, capturing an untagged voice frequency data generated from a user's voice, and analyzing and setting frequency features of the untagged voice frequency data as the voice frequency data by the audio control mechanism; and a6) setting the device identification code and the device authorization code of the information device to be related to the voice frequency data for reading, and recording the relationship in the multi-target connection data.

10. The voice control method of claim 7, wherein the wireless communication unit establishes the bidirectional wireless information connection with the information device in step (d) via IEEE802.15.1.

11. The voice control method of claim 7, wherein the audio capturing unit is disposed on the headphone.

12. The voice control method of claim 11, wherein the headphone wireless expansion device comprises:

an audio information transmission unit for receiving the unrecognized voice frequency signal from the headphone; and a control unit connecting to the audio information transmission unit and the wireless communication unit, and comprising the multi-target connection data and the audio control mechanism.

13. The voice control method of claim 7, wherein the audio capturing unit is disposed on the headphone wireless expansion device, and the headphone wireless expansion device comprises:

an audio information transmission unit connecting to the headphone to output the audio data to the headphone; and a control unit connecting to the audio information transmission unit and the wireless communication unit, and comprising the multi-target connection data and the audio control mechanism.

* * * * *